US006966705B2

(12) United States Patent
Sato et al.

(10) Patent No.: US 6,966,705 B2
(45) Date of Patent: Nov. 22, 2005

(54) OPTICAL CONNECTION SLEEVE, OPTICAL MODULE AND OPTICAL COMMUNICATION MODULE

(75) Inventors: Shunsuke Sato, Yokohama (JP); Toshio Mizue, Yokohama (JP); Ichiro Tonai, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 161 days.

(21) Appl. No.: 10/322,796

(22) Filed: Dec. 19, 2002

(65) Prior Publication Data

US 2003/0169978 A1    Sep. 11, 2003

(30) Foreign Application Priority Data

Dec. 19, 2001  (JP)  .......................... P2001-386435

(51) Int. Cl.[7] ............................................... G02B 6/42
(52) U.S. Cl. ............................. 385/88; 385/91; 385/92
(58) Field of Search .................................... 385/88–92

(56) References Cited

U.S. PATENT DOCUMENTS

| | | | |
|---|---|---|---|
| 5,452,389 A | | 9/1995 | Tonai et al. |
| 5,526,455 A | | 6/1996 | Akita et al. |
| 5,737,465 A | | 4/1998 | Okochi |
| 6,126,325 A | * | 10/2000 | Yamane et al. ............... 385/92 |
| 6,155,724 A | * | 12/2000 | Ichino et al. .................. 385/92 |
| 2002/0168153 A1 | * | 11/2002 | Yamabayashi et al. ....... 385/88 |
| 2003/0128552 A1 | * | 7/2003 | Takagi et al. ................ 362/555 |

FOREIGN PATENT DOCUMENTS

| | | |
|---|---|---|
| DE | 197 04 341 A1 | 8/1997 |
| EP | 0 826 998 A2 | 3/1998 |
| EP | 0 863 419 A1 | 9/1998 |
| WO | EP 0 887 865 A1 | 12/1998 |

* cited by examiner

*Primary Examiner*—Brian Healy
*Assistant Examiner*—Eric Wong
(74) *Attorney, Agent, or Firm*—McDermott Will & Emery LLP

(57) ABSTRACT

An optical connection sleeve 1 for optically connecting an optical fiber 41 and an optical device 51 is constituted by a resin sleeve 15 including an end portion 10 in which a ferrule 40 is inserted and a metal sleeve 16 including an end portion 12 on which the optical device 51 is disposed, the metal sleeve 16 being insert-molded in the resin sleeve 15 to be fixed thereto. With such a constitution, occurrence of positional deviation between the sleeve 1 and an optical device unit 50 is prevented, and the optical fiber 41 and the optical device 51 can be optically connected surely. Furthermore, it is prevented that the sleeve portion extending cylindrically functions as an antenna for electromagnetic noises. Accordingly, the optical connection sleeve in which the optical fiber and an optical component as the optical device are optically connected with high accuracy, and influences of the electromagnetic noises are fully reduced, an optical module and an optical communication module using the optical connection sleeve are realized.

6 Claims, 9 Drawing Sheets

OPTICAL CONNECTION SLEEVE, OPTICAL MODULE AND OPTICAL COMMUNICATION MODULE

BACKGROUND OF THE INVENTION

1. Field of the Invention

The present invention relates to an optical connection sleeve used for an optical connection between an optical fiber and an optical component, an optical module using the same, and an optical communication module.

2. Related Background of the Invention

In an optical communication system such as an optical data link and an optical LAN using light as an information transmission medium, information is transmitted by transmitting a light signal through an optical transmission path such as an optical fiber transmission path. In such an optical communication system, an optical communication module having an optical device for converting one of optical and electrical signals to the other is used in order to receive/send the light signal to be transmitted.

In an optical module such as the above described optical communication module, an optical connection sleeve is provided in order to optically connect an optical fiber used in the optical transmission path and an optical component such as an optical device provided in the optical module. In an optical module having the optical connection sleeve, the optical component such as the optical device is ordinarily positioned to the sleeve and fixed thereto. Then, a ferrule provided in a tip end of the optical fiber that is an optical connection object is inserted in the sleeve, whereby the optical fiber and the optical device are optically connected.

SUMMARY OF THE INVENTION

In the above described optical connection sleeve, an optical axis of the optical device which is previously positioned to the sleeve and fixed thereto and that of the optical fiber which is inserted to the sleeve and fixed thereto must be coincident with each other precisely in order to allow the light signal to input or output to/from the optical module with high efficiency.

FIG. 9 is a side view partially opened showing a constitution of an optical connection sleeve that has been conventionally used. The optical connection sleeve 9 illustrated in FIG. 9 is constituted by a first sleeve 90 including a one end portion positioned on the side in which an optical fiber is inserted; a second sleeve 95 including the other end portion positioned on the side in which an optical component is located; and a third sleeve 96 positioned on the inner sides of the first and second sleeves 90 and 95.

The first sleeve 90 is made of a metal sleeve, and a ferrule insertion hole 92 is provided on its inner side, which is formed so as to extend along an optical axis C from an opening 91 provided on one end portion side thereof. A ferrule 99 including an optical fiber that is an optical connection object is inserted into the ferrule insertion hole 92. Furthermore, the second sleeve 95 is made of a metal sleeve, and similarly positioned to the metal-made first sleeve 90 to be fixed thereto. Thus, a metal sleeve serving as an outer portion of the sleeve 9 is integrally constituted by the first and second sleeves 90 and 95.

A concave portion 93 having an enlarged inner diameter is provided at a predetermined range of an inner peripheral surface of the metal sleeve constituted by the first and second sleeves 90 and 95, and a third sleeve 96 is set so as to be embedded in the concave portion 93. The third sleeve 96 is constituted by, for example, a ceramic-made precise sleeve or split sleeve capable of positioning the ferrule 99 with high accuracy to fix thereto.

A flange portion 97 including an end plane serving as an opposite side of the first sleeve 90 is provided in the metal-made second sleeve 95. The flange portion 97 serves as a fixing portion which positions an optical device unit 98 and fixes it thereto. The optical device unit 98 has an optical device 98a optically connected to the optical fiber. The optical device unit 98 has a metal-made fixing part 98b, and the flange portion 97 of the optical connection sleeve 9 and the fixing part 98b of the optical device unit 98 are fixed integrally to each other by use of a YAG welding or the like.

In this optical connection sleeve 9, the metal-made optical connection sleeve and the optical device unit are previously positioned to each other and fixed to each other by a YAG welding so that optical axes of them are made to be coincident with each other. Thus, positional deviation between the sleeve and the optical device unit after an optical axis alignment (center alignment) is prevented from occurring, and hence an optical connection of the optical fiber to be inserted in the sleeve and the optical device included in the optical device unit can be surely realized. On the other hand, when the optical connection sleeve made of the metal sleeve as described above is applied to an optical module, there has been a problem that the metal sleeve extending cylindrically from one end portion to which the optical device unit is fixed to the other end portion in which the optical fiber is inserted functions as an antenna for receiving electromagnetic noises from the outside and for radiating electromagnetic noises from the inside.

To cope with this problem, it has been investigated that a resin sleeve is used as the optical connection sleeve in the optical module. Since the sleeve does not function as the antenna if the optical connection sleeve is made of resin, it is possible to reduce influences of the electromagnetic noises on the optical module.

However, since in this resin sleeve, the sleeve and the optical device unit cannot be welded to each other, both of them must be positioned and fixed to each other by adhering them by use of resin or the like. At this time, a problem is posed in which a positional deviation between the sleeve and the optical device unit occurs after an optical axis alignment due to influences of thermal expansion of resin adhesive and creep, thus making it impossible to optically connect the optical fiber and the optical device with a sufficient accuracy.

The present invention was made to solve the foregoing problems, and an object of the present invention is to provide an optical connection sleeve in which an optical fiber and an optical component such as an optical device are optically connected to each other with a high accuracy, and influences of electromagnetic noises are sufficiently reduced, an optical module using the same, and an optical communication module.

To achieve the above described object, the optical connection sleeve according to the present invention is (1) a sleeve formed around an optical axis of optical connection as a central axis, which optically connecting an optical fiber, which is inserted along the central axis from one end portion, to an optical component disposed on the other end portion, the optical connection sleeve comprises: (2) a resin-made first sleeve formed so as to include the one end portion, and having a ferrule insertion portion in which a ferrule provided in a tip of the optical fiber is inserted, the optical fiber being an object of the optical connection; and (3) a metal-made second sleeve formed so as to include the other end portion, and having a fixing portion which positions and fixes the optical component thereto, the second sleeve being fixed to the first sleeve.

In the foregoing optical connection sleeve, a portion including the end portion on the side where the optical component is arranged, is constituted by a metal sleeve. Thus, when the optical connection sleeve is applied to an optical module, a fixing portion provided in the metal sleeve and a metal-made fixing portion in a housing in which the optical component is provided (for example, a housing of the optical device unit in which an optical device is provided) can be positioned and fixed to each other integrally by use of YAG welding or the like. At this time, occurrence of positional deviation between the sleeve and the optical device unit and the like after optical axis alignment is prevented, and the optical fiber that is an object of optical connection and the optical component can be optically connected to each other surely.

Furthermore, a portion including an end portion of the optical connection sleeve in which the optical fiber is inserted is constituted by the resin sleeve. Thus, it is prevented that the sleeve portion cylindrically extending functions as an antenna which receives electromagnetic noises from the outside or radiates electromagnetic noises from the inside.

Furthermore, the metal sleeve closer to the optical component is fixed to the resin sleeve, whereby the whole of the optical connection sleeve is obtained. Thus, the metal sleeve and the resin sleeve are positioned and fixed to each other surely. Accordingly, the optical connection sleeve, in which the optical fiber and the optical component such as the optical device are optically connected to each other with high accuracy and influences of the electromagnetic noises are fully reduced, is realized.

Concerning the constitution in which the metal-made second sleeve is fixed to the resin-made first sleeve, it is preferable that the second sleeve is insert-molded to the first sleeve. Thus, the metal sleeve and the resin sleeve are easily and surely positioned and fixed to each other. Also, it is preferable that the second sleeve is fixed to the first sleeve so as to withstand a load of 40 N.

An optical module according to the present invention comprises (a) the optical connection sleeve described above; and (b) an optical device unit provided on the other end portion of the optical connection sleeve, (c) wherein the optical device unit has an optical device as the optical component optically connected to the optical fiber inserted from the one end portion, the optical device converting one of a light signal and an electrical signal corresponding thereto to the other, and the optical device unit is positioned and fixed to the fixing portion provided in the second sleeve of the optical connection sleeve.

With such a constitution, obtained is the optical module, in which the optical fiber in the ferrule, which is inserted in the optical connection sleeve to be held, and the optical device, which is previously positioned and fixed to the sleeve, are optically connected with high accuracy, and in which influences of electromagnetic noises are fully reduced.

An optical communication module according to the present invention comprises a photodetector module that is the foregoing optical module, which has a photodetector device as the optical device, the photodetector device receiving a light signal from the optical fiber; an electronic circuit for processing the electrical signal outputted from the photodetector device; and a housing for integrally holding the photodetector module and the electronic circuit.

Alternatively, an optical communication module according to the present invention comprises a light emitting module that is the foregoing optical module, which has a light emitting device as the optical device, the light emitting device sending out a light signal to the optical fiber; an electronic circuit for supplying the electrical signal inputted to the light emitting device; and a housing for integrally holding the light emitting module and the electronic circuit.

Still alternatively, an optical communication module according to the present invention comprises a photodetector module that is the foregoing optical module, which has a photodetector device as the optical device, the photodetector device receiving a light signal from the optical fiber; an electronic circuit for reception for processing the electrical signal outputted from the photodetector device; a light emitting module that is the foregoing optical module, which has a light emitting device as the optical device, the light emitting device sending out a light signal to the optical fiber; an electronic circuit for transmission for supplying the electrical signal inputted to the light emitting device; and a housing for integrally holding the photodetector module, the electronic circuit for reception, the light emitting module and the electronic circuit for transmission.

With such a constitution, when the optical communication module is applied to an optical communication system using an optical fiber transmission path, the optical communication module (the light receiving module, the light transmitting module and the light transceiver), which is capable of receiving and transmitting a light signal with high efficiency in a state where influences of electromagnetic noises are fully reduced, is realized.

DESCRIPTION OF THE PREFERRED EMBODIMENTS

Figure 1:
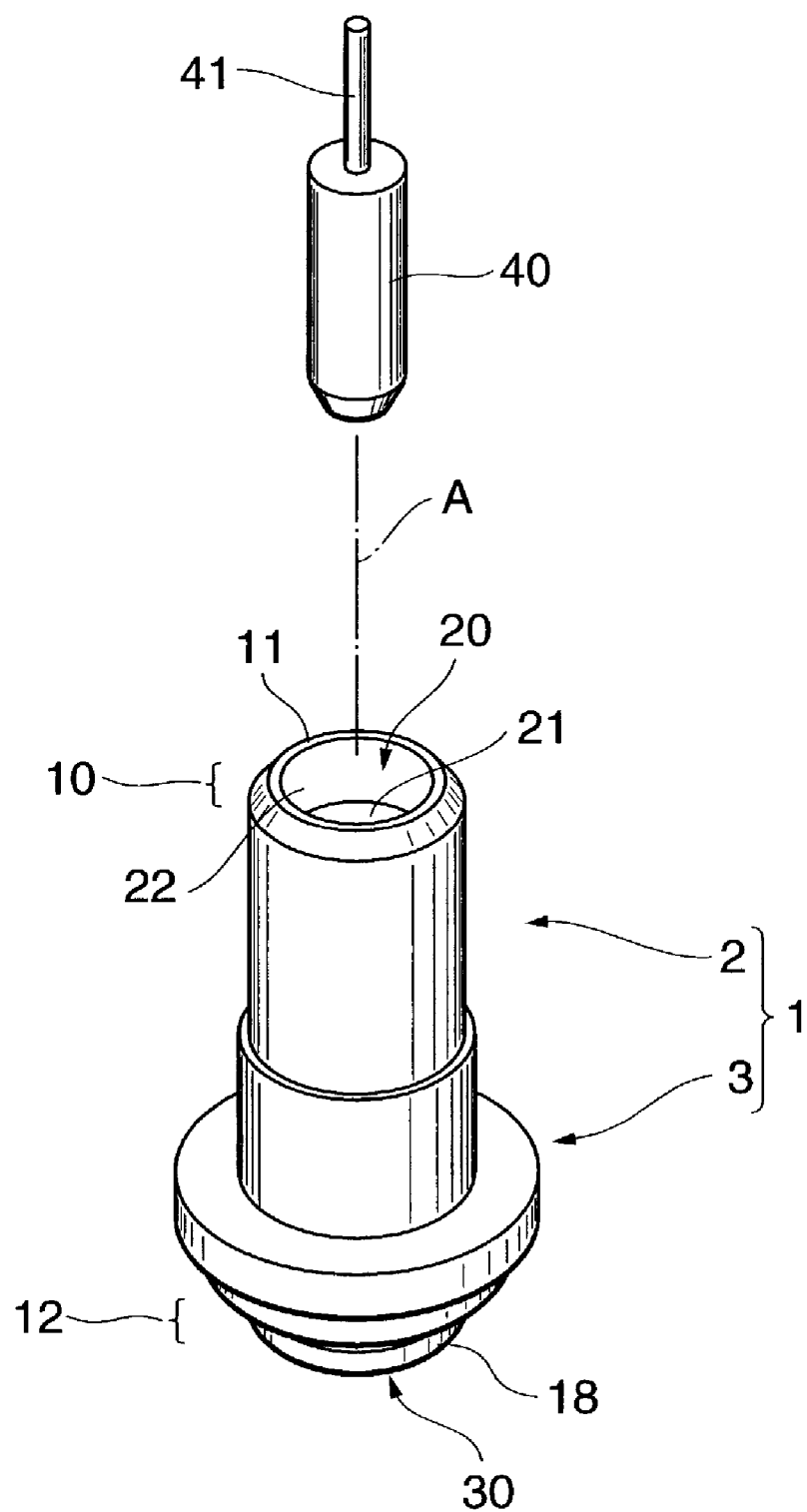
FIG. 1 is a perspective view showing a constitution of an embodiment of an optical connection sleeve.

Detailed description will be made for preferred embodiments of an optical connection sleeve, an optical module and an optical communication module according to the present invention with reference to the accompanying drawings below. Note that in explaining the drawings, the same constituent components are denoted by the same reference symbols and repetitive explanations are omitted. Furthermore, note that a dimensional ratio in the drawings is not necessarily in agreement with that in the descriptions.

Figure 2:
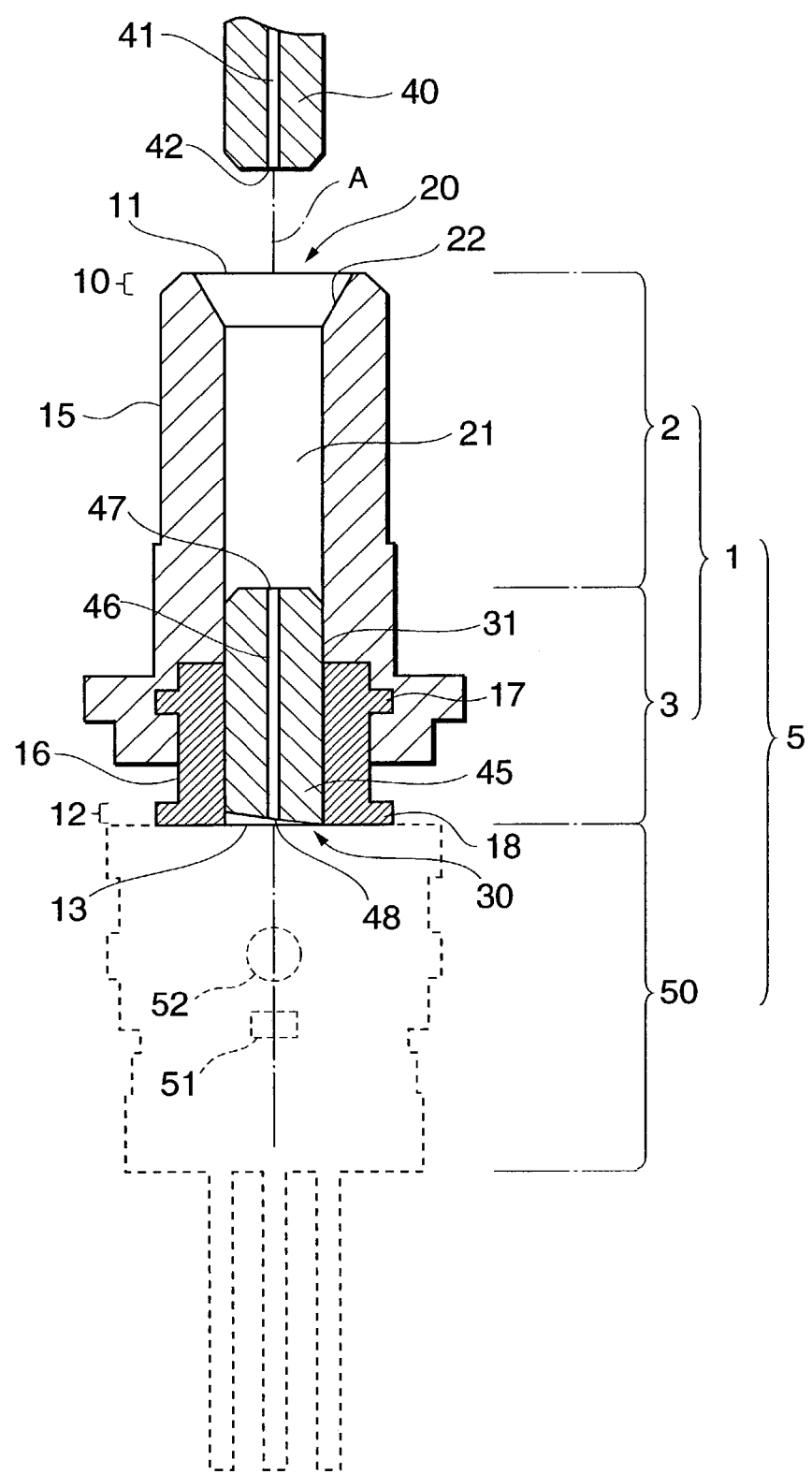
FIG. 2 is a cross sectional side view showing a cross-section structure taken along a plane including an optical axis of the optical connection sleeve shown in FIG. 1.

FIG. 1 is a perspective view showing a constitution of an embodiment of the optical connection sleeve according to the present invention. FIG. 2 is a cross sectional side view showing a cross-section structure taken along a plane including an optical axis of the optical connection sleeve shown in FIG. 1.

An optical connection sleeve 1 is formed so that a basic shape of its entire structure is approximately cylindrical around a central axis which is an optical axis A of an optical connection. This optical connection sleeve 1 is the sleeve for optically connecting an optical fiber, which is inserted therein from one end portion 10, to an optical component disposed on the other end portion 12.

Herein, an optical fiber 41 that is an object of the optical connection in the optical connection sleeve 1 is, for example, the one used as an optical transmission path in an optical communication system using light as an information transmission medium. On this optical fiber 41, a ferrule 40 is provided on the outer peripheral surface of its tip end as shown in FIGS. 1 and 2.

The optical connection sleeve 1 comprises a resin sleeve (first sleeve) 15 of an approximately cylindrical shape, which is formed so as to include one end portion 10 of the optical connection sleeve 1; and a metal sleeve (second sleeve) 16 of an approximately cylindrical shape, which is formed so as to include the other end portion 12. The resin sleeve 15 and the metal sleeve 16 are united with each other, whereby the entire of the optical connection sleeve 1 is constituted.

In this embodiment, the metal sleeve 16, which is on a side where the optical component is arranged, is insert-molded to the resin sleeve 15, which is on the other side which the optical fiber is inserted into. Thus, the optical connection sleeve 1 is constituted, in which the resin sleeve 15 and the metal sleeve 16 are united with each other in a state where the sleeves 15 and 16 are positioned with each other.

A protrusion portion 17 protruding which forms a annular shape (flange shape) around the optical axis A is provided at a prescribed position on the outer peripheral surface of the metal sleeve 16. This protrusion portion 17 protrudes into the resin of the resin sleeve 15 which is executed insert-molding of the metal sleeve 16 in order to work as a fixing reinforcement portion to reinforce fixing strength. With such a constitution, the metal sleeve 16 is fixed to the resin sleeve 15 so as to withstand a load of 40N.

Furthermore, a flange portion 18 is provided at a portion including an end plane (a lower end plane in FIG. 2) opposite to the resin sleeve 15, which is placed on the end portion 12 of the metal sleeve 16. This flange portion 18 serves as a fixing portion, as described later, for positioning and fixing an optical component, which is optically connected to the optical fiber 41, to the optical connection sleeve 1.

The optical connection sleeve 1 prepared by integrating the resin sleeve 15 and the metal sleeve 16 with each other is constituted by a ferrule insertion portion 2 including an opening 11 provided on one end portion 10 thereof with respect to the optical axis A and an optical connection portion 3 including an opening 13 provided on the other end portion 12 thereof. In this embodiment, the portion of the resin sleeve 15 including the end portion 10 serves as the ferrule insertion portion 2. The portion close to the end portion 12 of the resin sleeve 15 and the metal sleeve 16 serves as the optical connection portion 3.

A ferrule insertion hole 20 extending from the opening 11 along the optical axis A is provided inside the ferrule insertion portion 2. A major portion of the inner peripheral surface of the ferrule insertion portion 2 facing the ferrule insertion hole 20 is a ferrule fixing surface 21 having an approximately cylindrical shape. This ferrule fixing surface 21 serves to position and fix a ferrule 40, which is provided on the tip end of the optical fiber 41 to be inserted into the ferrule insertion hole 20, to the sleeve 1.

In terms of the ferrule fixing surface 21, its inner diameter is set so as to be slightly smaller than an outer diameter of the ferrule 40 to be inserted therein. Thus, the ferrule 40 including the optical fiber 41 that is an object of the optical connection is positioned and fixed in the ferrule insertion hole 20 by tight fit using elastic deformation of the resin when the ferrule 40 is inserted in the ferrule insertion hole 20. A part of the inner peripheral surface of the ferrule insertion portion 2, which is positioned close to the opening 11, serves as a tapered portion 22 for guiding the ferrule 40, which is inserted from the opening 11, into the ferrule insertion hole 20.

On the other hand, inside the optical connection portion 3, an optical fiber 46 is provided as an optical waveguide path extending along the optical axis A. This optical fiber 46 is the optical waveguide path for use in the optical connection, which is provided for optically connecting the optical fiber 41 and the optical component. The optical fiber 41 is inserted from the opening 11 on the end portion 10 as the object of the optical connection, and the optical component is arranged close to the opening 13 on the end portion 12.

In this embodiment, a ferrule housing hole 30 extending from the opening 13 along the optical axis A is provided inside the optical connection portion 3. This ferrule housing hole 30 is constituted so as to communicate with the ferrule insertion hole 20 of the ferrule insertion portion 2. The inner peripheral surface of the optical connection portion 3 facing to the ferrule housing hole 30 is a ferrule fixing surface 31. This ferrule fixing surface 31 forms an approximately cylindrical surface continuous to the ferrule fixing surface 21 of the ferrule insertion portion 2.

The foregoing optical fiber 46 for the optical connection is previously housed inside the ferrule housing hole 30 together with the ferrule 45 provided on the outer surface thereof. With such a constitution, the optical fiber 46 for the optical connection is positioned and fixed to the optical connection sleeve 1 via the ferrule 45 and the ferrule fixing surface 31.

In the above described constitution, when the ferrule 40 including the optical fiber 41 is inserted in the ferrule insertion hole 20 of the ferrule insertion portion 2 from the opening 11, a connection face 42 that is an end face of the optical fiber 41 located on the central axis of the ferrule 40 and an end face 47 of the optical fiber 46 located on the central axis of the ferrule 45 provided in the optical connection portion 3 contact with each other physically. Thus, the optical fiber 41 that is the object of the optical connection and the optical fiber 46 for the optical connection are optically connected to each other.

Herein, a case in which the optical component is arranged at a prescribed position facing the other end face 48 of the optical fiber 46 along the optical axis, the position being close to the opening 13 of the optical connection portion 3, will be considered. At this time, the optical fiber 41 inserted from the opening 11 of the sleeve 1, the optical fiber 46 for the optical connection, and the optical component disposed close to the opening 13 are arranged along the optical axis A. Thus, the optical fiber 41 and the optical component are optically connected to each other via the optical fiber 46 that is the optical waveguide path for the optical connection.

Effects of the optical connection sleeve 1 having the above described constitution will be described.

In the optical connection sleeve 1 of this embodiment, the portion including the end portion 12, where the optical component such as the optical device optically connected to the optical fiber 41 is disposed, is constituted by the metal-made second sleeve 16. Thus, when the optical connection sleeve 1 is applied to the optical module, the flange portion 18 provided in the metal sleeve 16 as the fixing portion and the metal-made fixing portion in the housing in which the optical component is arranged can be positioned and fixed unitedly with each other by use of YAG welding or the like. At this time, the occurrence of the positional deviation between the sleeve 1 and the optical component after the optical axis alignment is prevented, and the optical fiber 41 and the optical component such as the optical device, which are the objects of the optical connection, can be optically connected to each other surely.

In the optical connection sleeve 1, the portion including the end portion 10 from which the ferrule 40 including the optical fiber 41 is inserted is constituted by the resin-made first sleeve 15. Herein, if the whole of the optical connection sleeve is made of metal, the sleeve and the housing in which the optical component is arranged are surely positioned and fixed to each other by use of the YAG welding or the like. On the other hand, influences of electromagnetic noises owing to the metal sleeve functions as an antenna are a problem.

For example, a case where a light receiving module for receiving a light signal and a light transmitting module for transmitting a light signal are set will be considered. At this time, if an optical connection sleeve provided in the light receiving module is a metal sleeve, the metal sleeve functions as an antenna for receiving electromagnetic noises from the outside. Therefore, in such a light receiving module, receiving efficiency in receiving the light signal inputted thereto from the optical fiber declines.

If the optical connection sleeve provided in the light transmitting module is a metal sleeve, the metal sleeve functions as an antenna for radiating electrical signals from internal circuits as electromagnetic noises to the outside. Therefore, such a light transmitting module adversely affects a light receiving module placed closely and other optical modules.

On the contrary, in the case of the foregoing optical connection sleeve 1, the whole of the optical connection sleeve 1 is constituted by the combination of the metal sleeve 16 including the flange portion 18 that is the fixing portion and the resin sleeve 15 including the ferrule insertion portion 2. Thus, it is prevented that the sleeve portion cylindrically extending from the end portion 12, in which the optical component is arranged, to the end portion 10, in which the optical fiber 41 is inserted, functions as the antenna for receiving the electromagnetic noises from the outside and for radiating the electromagnetic noises from the inside.

Moreover, in the foregoing constitution, the metal sleeve 16 located on the optical component side is fixed to the resin sleeve 15 located on the optical fiber side with predetermined strength. Thus, the whole of the optical connection sleeve 1 obtained by uniting the sleeves 15 and 16 with each other can be obtained. As a result, the metal sleeve 16 can be surely positioned and fixed to the resin sleeve 15. Thus, the optical fiber 41 inserted from the end portion 10 and the optical component such as the optical device, which is arranged on the end portion 12, are optically connected to each other with high accuracy in position, and the optical connection sleeve 1 reducing the influences of the electromagnetic noises is realized.

As a constitution for fixing the metal sleeve 16 to the resin sleeve 15, the constitution in which the metal sleeve 16 is insert-molded into the resin sleeve 15 can be used as described above. Thus, compared to a constitution in which a resin sleeve and a metal sleeve are manufactured as separate parts and then united with each other, the metal sleeve 16 can be fixed against the resin sleeve 15 more easily and surely. Simultaneously, a unit price of the optical connection sleeve can be reduced. Moreover, a fixing method other than that the metal sleeve is insert-molded in the resin sleeve may be used. Also, as a constitution for fixing the sleeves, it is preferable that the metal sleeve 16 is fixed to the resin sleeve 15 so that the metal sleeve 16 can withstand a load of 40 N.

In the optical connection sleeve 1 of this embodiment, the fixing reinforcement portion for reinforcing the fixing strength by the insert-mold to the resin sleeve 15 is provided on the metal sleeve 16. Thus, the metal sleeve 16 can be surely fixed to the resin sleeve 15. Furthermore, the occurrence of the positional deviation between the metal sleeve 16 and the resin sleeve 15 after fixing can be suppressed.

As shown in the foregoing embodiment, as the fixing reinforcement portion, for example, there is the constitution in which the protrusion portion 17 is annularly provided on the outer peripheral surface of the metal sleeve 16. According to such a protrusion portion 17, particularly the fixing strength of the resin sleeve 15 and the metal sleeve 16 relative to the direction of the optical axis A is surely reinforced.

Descriptions for the connection of the optical connection sleeve 1 and the optical device unit in the foregoing embodiment and for the optical module obtained by connecting the optical device unit thereto will be made.

As the optical component optically connected to the optical fiber 41 of the optical transmission path via the optical fiber 46 provided for the optical connection, if an optical device for converting one of the light signal and the electrical signal corresponding thereto to the other is arranged for the optical connection sleeve 1 shown in FIGS. 1 and 2, an optical module such as a photodetector module and a light emitting module is obtained.

In FIG. 2, as the constitution example of such an optical module 5, an optical device unit 50 having an optical device 51 and a lens 52 is illustrated by the dotted lines. In this constitution example, the optical device unit 50 is fixedly provided on the end portion 12 of the optical connection sleeve 1 so that the optical axis of the optical device 51 and the lens 52 coincide with the optical axis A of the optical connection sleeve 1 precisely.

Figure 3:
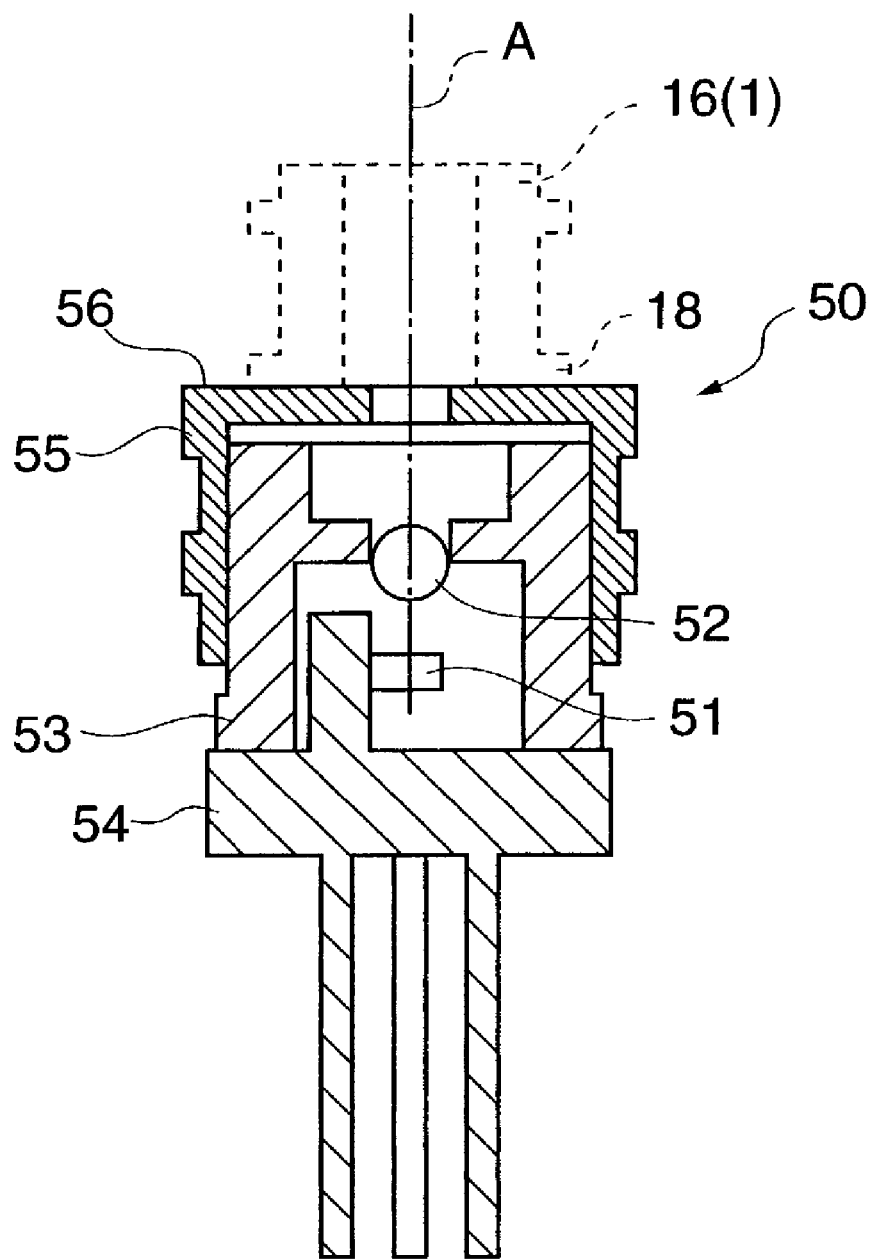
FIG. 3 is a cross sectional side view showing a cross-section structure taken along a plane including an optical axis of an optical device unit fixed to the optical connection sleeve.

FIG. 3 is a cross sectional side view showing a cross-section structure taken along a plane including the optical axis of the optical device unit fixed to the optical connection sleeve. The optical device unit 50 comprises the optical device 51 and the lens 52, which are optically connected to the optical fiber 41, and a housing accommodating these parts therein.

In the optical device unit 50 of the constitution example shown in FIG. 3, the housing accommodating the optical device 51 and the lens 52 comprises a metal-made cap portion 53 positioned close to the optical connection sleeve 1 (upper side) and a stem portion 54 located so as to be opposite the sleeve 1 (lower side). The stem portion 54 sustains the whole of the optical device unit 50 and connection terminals are provided on the lower face of the stem portion 54.

A fixing part 55 is provided on the cap portion 53 so as to be close to the optical connection sleeve 1. In terms of optically connecting the optical device 51 and the lens 52 with the optical fiber 46 for the optical connection in the optical connection sleeve 1, this fixing part 55 makes it possible to adjust the position of the housing, which is composed of the cap portion 53 and the stem portion 54, relative to the direction of the optical axis A. Furthermore, the fixing part 55 is made of metal, and the fixing part 55 and the cap portion 53 are fixed unitedly to each other by use of a YAG welding or the like.

An upper face of the fixing part 55 facing the optical connection sleeve 1 is a sleeve fixing face 56. When the optical module is constituted by fixing the optical device unit 50 to the optical connection sleeve 1, the lower face of the flange portion 18, which is provided in the metal sleeve 16 of the optical connection sleeve 1 as the fixing portion, and the sleeve fixing face 56 provided in the fixing part 55 of the optical device unit 50 are fixed to each other by use of the YAG welding or the like. In such a manner, the flange portion 18 and the fixing part 55 are united with each other by use of the YAG welding, whereby the optical connection sleeve 1 and the optical device unit 50 are positioned and fixed to each other so that the optical axes of the optical connection sleeve 1 and the optical device unit 50 are precisely coincident with each other.

As described above, an excellent optical module 5 is obtained by constituting the optical module composed of the optical connection sleeve 1 having the foregoing constitution and the optical device unit 50 having the optical device 51. Specifically, according to this optical module 5, the optical module is obtained, in which the optical fiber 41 in the ferrule 40, which is inserted in the optical connection sleeve 1 to be held, and the optical device 51, which is previously positioned and fixed to the sleeve 1, are optically connected to each other with high accuracy, and in which the influences of the electromagnetic noises are fully reduced.

For example, if a photodetector device for receiving a light signal is employed as the optical device 51, the optical module 5 is a photodetector module in which the optical fiber 41 of the optical transmission path and the photodetector device 51 are optically connected to each other with high accuracy by the optical connection sleeve 1. If the optical fiber 41 is connected to the photodetector module 5, a light signal inputted to the photodetector module 5 from the optical fiber 41 is received by the photodetector device 51 via the optical fiber 46 for the optical connection with high efficiency.

Furthermore, if a light emitting device for sending out a light signal is employed as the optical device 51, the optical module 5 is a light emitting module in which the optical fiber 41 of the light transmission path and the light emitting device 51 are optically connected to each other by the optical connection sleeve 1 with high accuracy. If the optical fiber 41 is connected to the light emitting module 5, a light signal outputted from the light emitting device 51 is sent out from the light emitting module 5 to the optical fiber 41 via the optical fiber 46 for the optical connection with high efficiency.

In the case of the photodetector module for receiving the light signal, required position accuracy is generally lower compared to an optical module for transmission. However, when the optical module is made to be compact-sized by use of an avalanche diode or the like having, for example, a light receiving diameter of 30 $\mu$m, high position accuracy is required also for the photodetector module similarly to the light emitting module. Accordingly, the optical connection sleeve 1 with the above described constitution is effective to any of the photodetector module and the light emitting module.

Next, descriptions for an optical communication module using the optical connection sleeve and the optical module of the foregoing embodiment will be made.

Figure 4:
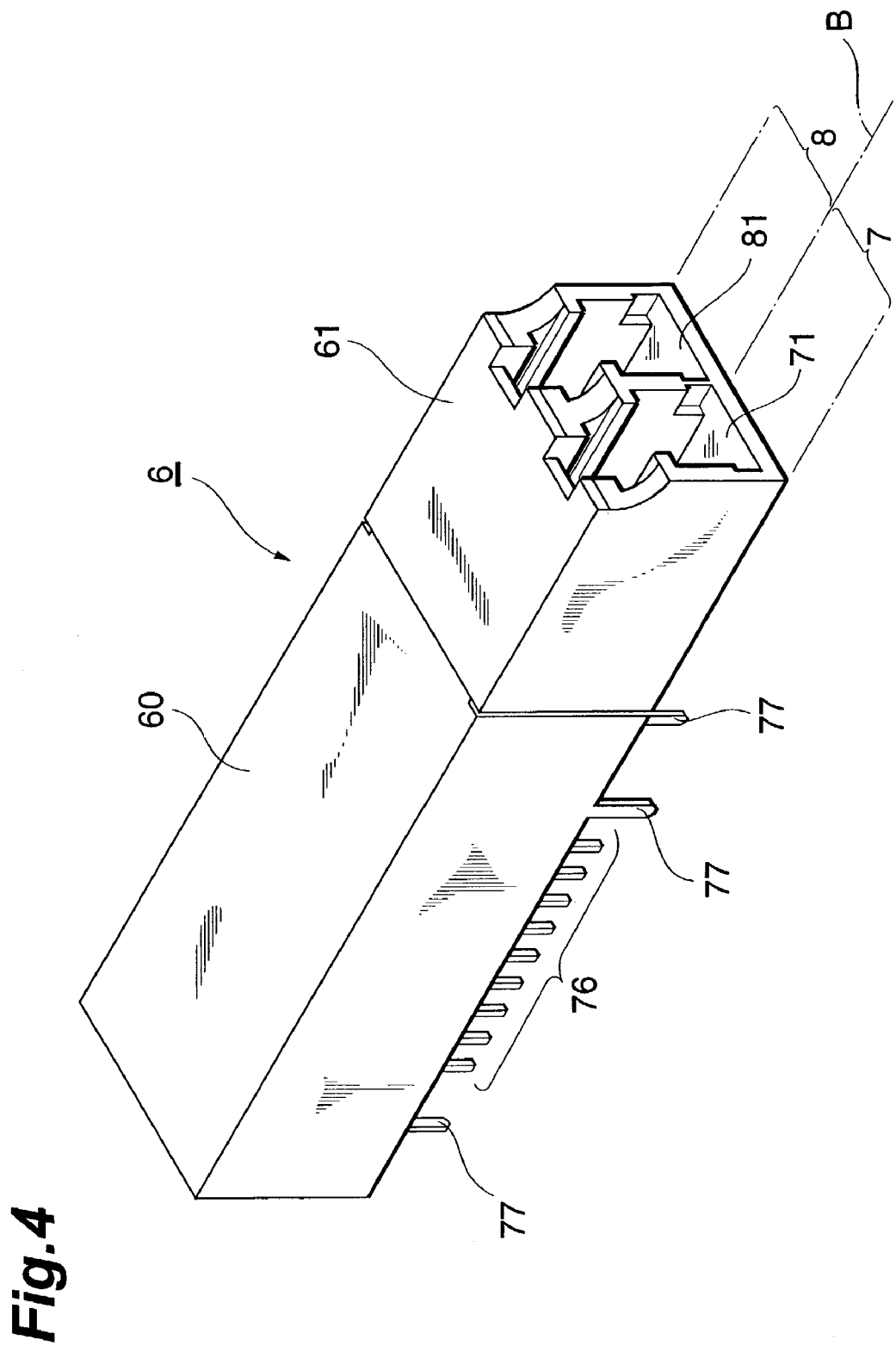
FIG. 4 is a perspective view showing a constitution of an embodiment of an optical communication module.
Figure 5:
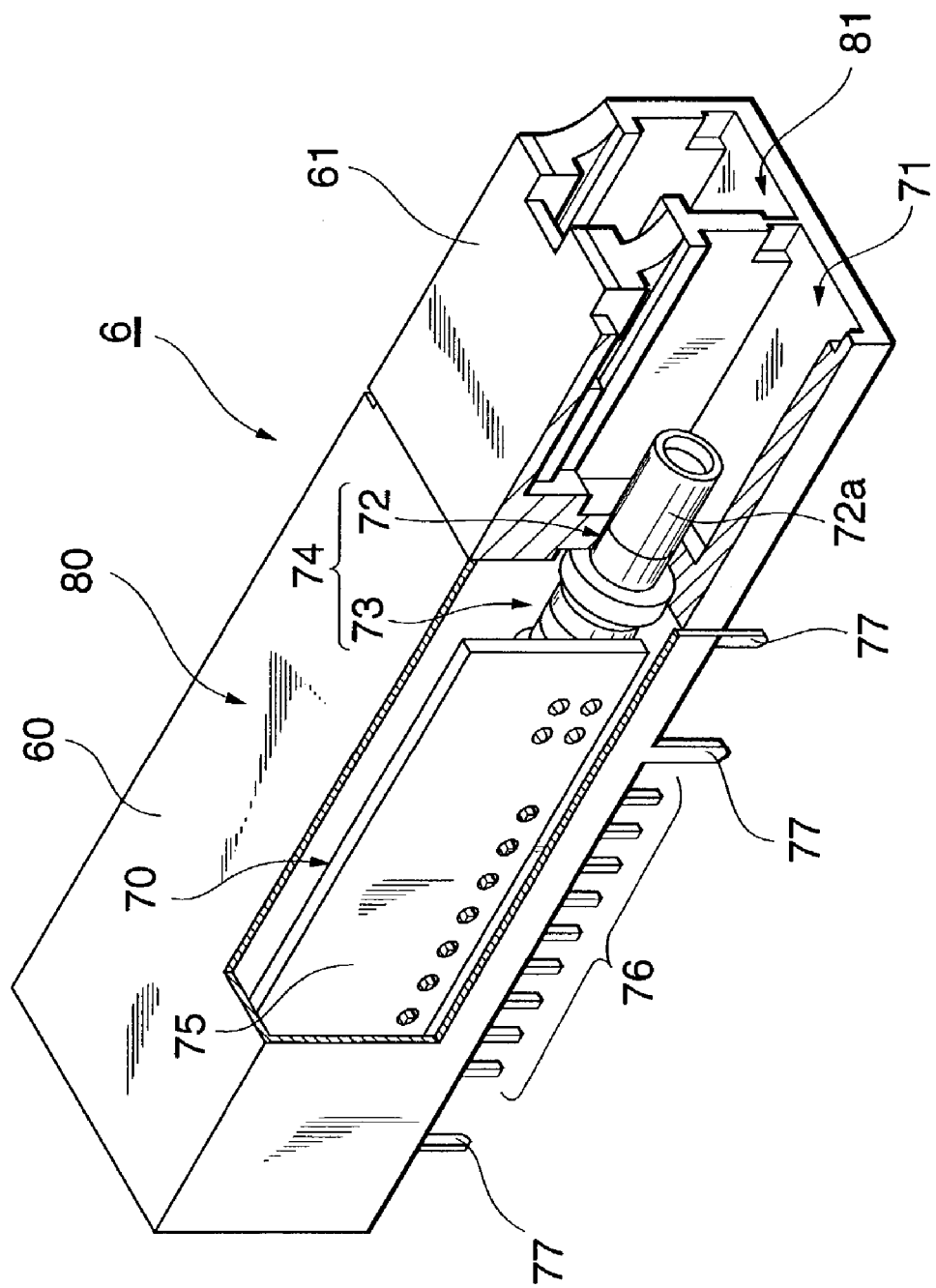
FIG. 5 is a perspective view of the optical communication module shown in FIG. 4, which is partially cut way to show an internal structure thereof.
Figure 6:
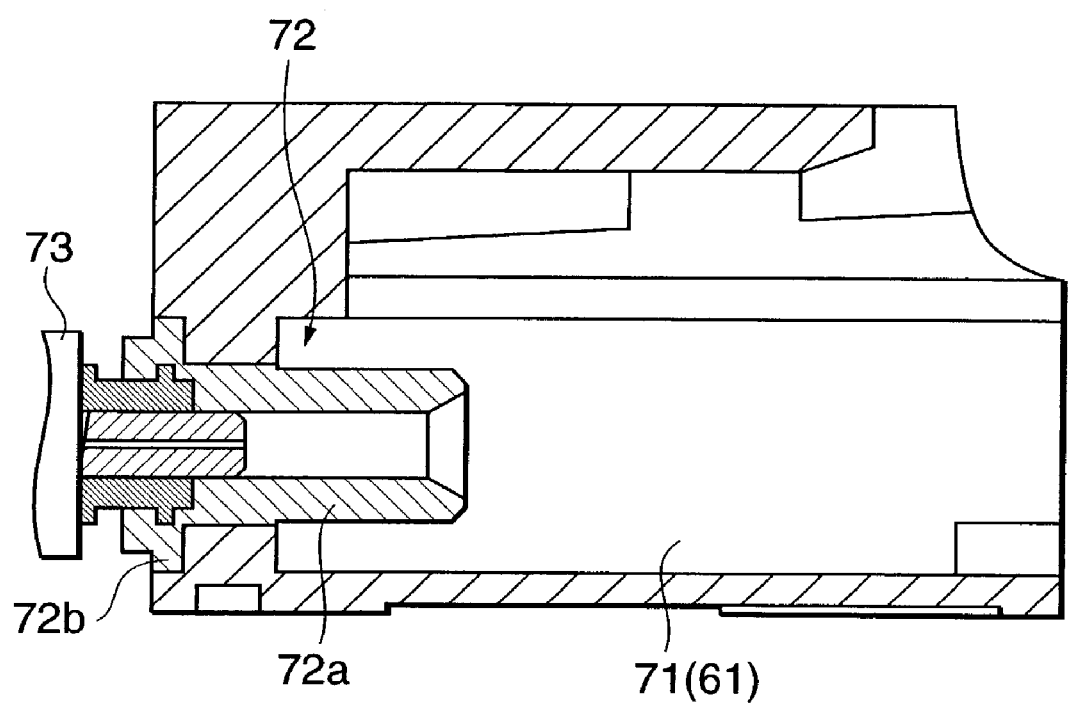
FIG. 6 is a partially enlarged cross sectional side view of the optical communication module shown in FIG. 4.

FIG. 4 is a perspective view showing a constitution of one embodiment of the optical communication module according to the present invention. FIG. 5 is a perspective view of the optical communication module shown in FIG. 4, which is partially cut away to explain an internal structure thereof. Moreover, FIG. 6 is a partially enlarged cross sectional side view of the optical communication module shown in FIG. 4, which shows a cross-section structure taken at a plane including an optical axis.

The optical communication module shown in FIGS. 4 and 5 is an optical transceiver 6 comprising a photodetector module and a light emitting module. The optical transceiver 6 comprises two optical communication module units composed of a first optical communication module unit 7 and a second optical communication module unit 8 which are obtained by splitting the optical transceiver 6 along an axis B. The axis B is a direction in which an optical fiber is connected thereto. Hereinafter, for example, the first optical communication module unit 7 is set as a light receiving module unit, and the second optical communication module unit 8 as a light transmitting module unit.

A housing of the optical transceiver 6 is composed of a housing body 60 for accommodating an optical module and the like including an optical connection sleeve, and a light receptacle 61 for detachably fitting an optical connector including the optical fiber to be the object of the optical connection and the ferrule provided at the tip of the optical fiber. In FIG. 5, an internal structure of the light receiving module unit 7 that is the first optical communication module unit is shown by cutting away parts of the housing body 60 and the light receptacle 61.

In the housing body 60, the portion belonging to the light receiving module unit 7 is a first housing portion 70 accommodates the photodetector module and the like. In the light receptacle 61, the portion belonging to the light receiving module unit 7 is a first receptacle portion 71 to which the optical connector is detachably attached. The optical connector is for connecting the optical fiber, which inputs a light signal to the optical transceiver 6, thereto.

A photodetector module 74 composed of an optical connection sleeve 72 having the constitution shown in FIG. 1 and a photodetector device unit 73 having a photodetector device is accommodated in the first housing portion 70. Moreover, the optical connection sleeve 72 is set so that a ferrule insertion portion 72a protrudes to the inside of the receptacle portion 71 along the optical axis of the optical connection as shown in FIG. 6, and the optical connection sleeve 72 and the receptacle portion 71 are positioned and fixed to each other by a flange portion 72b formed on an outer peripheral surface of a resin sleeve of the sleeve 72.

Thus, when the receptacle portion 71 is fitted with the optical connector, the ferrule of the optical fiber included in the optical connector is inserted in a ferrule insertion portion 72a of the optical connection sleeve 72, and the optical fiber and the photodetector device included in the photodetector device unit 73 are optically connected.

A wiring board 75 having an electronic circuit for reception for processing an electrical signal outputted from the photodetector device of the photodetector device unit 73 is accommodated in the housing portion 70. The electronic circuit provided in the wiring board 75 is electrically connected to the photodetector device unit 73. In the lower portion of the housing portion 70, provided are external terminals 76 used for inputting/outputting the electrical signals to/from the electronic circuit for reception of the wiring board 75, and studs 77 including the one for grounding.

The first optical communication module unit 7 is constituted by the photodetector module 74 composed of the optical connection sleeve 72 and the photodetector device unit 73, the wiring board 75 including the electronic circuit for reception, and the first housing portion 70 that is a housing for holding them united. This optical communication module unit 7 is a light receiving module which receives the light signal from the optical fiber, which is connected by the optical connector attached to the receptacle portion 71, via the optical connection sleeve 72 with the photodetector device of the photodetector device unit 73.

The portion belonging to the light transmitting module unit 8 in the housing body 60 is the second housing portion 80 for accommodating the light emitting module and the like. Furthermore, the portion belonging to the light transmitting module unit 8 in the light receptacle 61 is the second receptacle portion 81 to which the optical connector for connecting the optical fiber thereto, which outputs the light signal from the optical transceiver 6, is detachably attached.

Inside the second housing portion 80, accommodated area light emitting module composed of an optical connection sleeve having the constitution shown in FIG. 1 and a light emitting device unit having a light emitting device, which are not illustrated. Furthermore, the optical connection sleeve is located so that the ferrule insertion portion protrudes to the inside of the receptacle portion 81 along the optical axis of the optical connection.

Thus, when the optical connector is attached to the receptacle portion 81, the ferrule of the optical fiber included in the optical connector is inserted in the ferrule insertion portion of the optical connection sleeve, and the optical fiber and the light emitting device included in the light emitting device unit are optically connected to each other.

In the housing portion 80, accommodated is a wiring board having an electronic circuit for transmission which supplies an electrical signal inputted to the light emitting device of the light emitting device unit. The electronic circuit provided in this wiring board is electrically connected to the light emitting device unit. In the lower portion of the housing portion 80, external terminals used for inputting/outputting the electrical signal to/from the electronic circuit for transmission provided on the wiring board, and studs including the one for grounding are provided.

The second optical communication module unit 8 is constituted by the light emitting module composed of the optical connection sleeve and the light emitting device unit, the wiring board including the electronic circuit for transmission, and the second housing portion 80 that is a housing for holding them united. This optical communication module unit 8 is a light transmitting module which transmits the light signal, which is supplied from the light emitting device of the light emitting device unit, to the optical fiber, which is connected by the optical connector attached to the receptacle portion 81, via the optical connection sleeve.

As described above, the optical transceiver 6 is constituted by use of the photodetector module and the light emitting module comprising the optical connection sleeve having the foregoing constitution, whereby a excellent optical communication module is provided. According to this optical transceiver 6, when the optical transceiver 6 is applied to an optical communication system using an optical fiber transmission path, receiving and transmission of the light signal can be performed with high efficiency in a state where influences of electromagnetic noises are thoroughly reduced.

Figure 7:
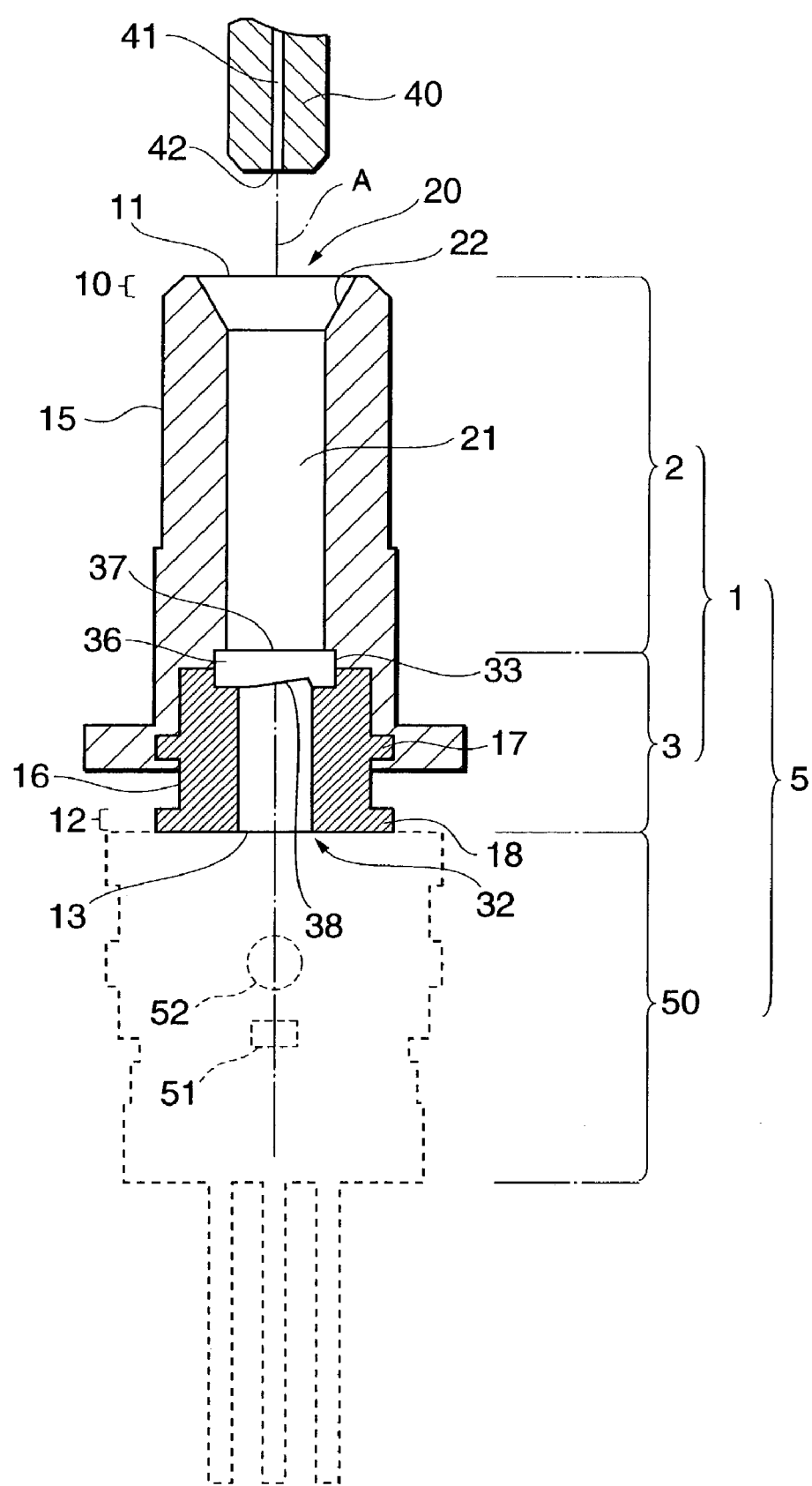
FIG. 7 is a cross sectional side view showing a section structure taken along a plane including an optical axis of another embodiment of the optical connection sleeve.

FIG. 7 is a cross sectional side view showing a cross-section structure taken along a plane including an optical axis of the optical connection sleeve in another embodiment according to the present invention.

The optical connection sleeve 1 shown in FIG. 7 comprises a resin sleeve 15 including one end portion 10 and a metal sleeve 16 including the other end portion 12, similarly to the optical connection sleeve shown in FIGS. 1 and 2. The resin sleeve 15 and the metal sleeve 16 are united with each other, whereby the whole of the optical connection sleeve 1 is constituted.

In this embodiment, the metal sleeve 16 is insert-molded in the resin sleeve 15. As a fixing reinforcement portion, a protrusion portion 17 protruding annularly is provided at a predetermined position on the outer peripheral surface of the metal sleeve 16. With such a constitution, the metal sleeve 16 is fixed to the resin sleeve 15 so that the metal sleeve 16 can withstand a load of 40 N. A flange portion 18 serving as a fixing portion is provided on the side of the end portion 12 of the metal sleeve 16.

The optical connection sleeve 1 comprises a ferrule insertion portion 2 including an opening 11 on the one end portion 10 and being constituted by a portion of a resin sleeve 15 close to the end portion 10; and an optical connection portion 3 including an opening 13 on the other end portion 12 and being constituted by a portion of the resin sleeve 15 close to the end portion 12 and the metal sleeve 16. Herein, a constitution of the ferrule insertion portion 2 having a ferrule insertion hole 20, a ferrule fixing surface 21 and a tapered portion 22 is the same as that of the embodiment shown in FIGS. 1 and 2.

On the other hand, a glass member 36 functioning as an optical waveguide path along the optical axis A is provided inside the optical connection portion 3. This glass member 36 is an optical waveguide member for an optical connection, which is provided so as to optically connect an optical fiber 41, which is inserted from the opening 11 on the end portion 10 as an object of the optical connection, and an optical component, located close to the opening 13 on the end portion 12.

In this embodiment, a glass member housing hole 32 extending from the opening 13 along the optical axis A is provided inside the optical connection portion 3. This glass member housing hole 32 communicates with the ferrule insertion hole 20 of the ferrule insertion portion 2. Out of the inner peripheral surface of the optical connection portion 3 facing the glass member housing hole 32, a predetermined portion closer to the end portion 10 constitutes a glass member fixing surface 33. This glass member fixing surface 33 is a concave surface having an inner diameter larger than that of the ferrule fixing surface 21 of the ferrule insertion portion 2.

The foregoing glass member 36 for the optical connection is previously housed in the glass member housing hole 32. With such a constitution, the glass member 36 for the optical connection is positioned and fixed to the optical connection sleeve 1 via the glass member fixing surface 33.

In the foregoing constitution, when the ferrule 40 including the optical fiber 41 is inserted in the ferrule insertion hole 20 of the ferrule insertion portion 2 from the opening 11, a connection face 42 that is an end face of the optical fiber 41 on the central axis of the ferrule 40 and an end face 37 of the glass member 36 provided in the optical connection portion 3 physically contact with each other. Thus, the optical fiber 41 that is the object of the optical connection and the glass member 36 for the optical connection are optically connected.

Herein, considered is a case where an optical component is located at a predetermined position closer to the opening 13 of the optical connection portion 3, the position facing the other end face 38 of the glass member 36 along the optical axis. At this time, the optical fiber 41 inserted from the opening 11 of the sleeve 1, the glass member 36 for the optical connection and the optical component located on the side of the opening 13 are disposed along the optical axis A. Thus, the optical fiber 41 and the optical component are optically connected via the glass member 36 that is the waveguide member for the optical connection.

Effects of the optical connection sleeve 1 having the above described constitution will be described.

In the optical connection sleeve 1 of this embodiment, the metal sleeve 16 placed on the optical component side is fixed to the resin sleeve 15 on the optical fiber side with predetermined strength, where by the whole of the optical connection sleeve 1 in which the sleeves 15 and 16 are united with each other is obtained. Thus, the optical fiber 41 inserted from the end portion 10 and the optical component such as an optical device located closer to the end portion 12 are optically connected with high positional accuracy, and the optical connection sleeve 1 in which influences of electromagnetic noises are thoroughly reduced is realized.

In this embodiment, as the optical waveguide for the optical connection provided in the optical connection sleeve 1, the glass member 36 is used. Also in such a constitution, the optical fiber 41 inserted from the opening 11 of the sleeve 1 and the optical component located closer to the opening 13 can be optically connected satisfactorily, as in the constitution that the optical fiber is used as the optical waveguide.

This glass member 36 can shorten the length of the waveguide of the optical waveguide path for the optical connection, and can make the optical connection sleeve and the optical module compact-sized. Furthermore, the glass member 36 is excellent in mass-production. Note that the optical connection between the optical component and the glass member 36 can be adjusted, for example, by a lens and the like.

The optical connection sleeve, the optical module and the optical communication module according to the present invention are not limited to the foregoing embodiments, and various modifications of them are available. For example, on the optical connection sleeve 1 shown in FIG. 1, in order to optically connect the optical fiber 41 closer to the end portion 10 and the optical component closer to the end portion 12, the optical fiber 46 previously fixed to the sleeve 1 is used as the optical waveguide path for the optical connection. As to such an optical waveguide path, a constitution in which the optical waveguide for the optical connection is not provided may be adopted when it is possible to optically connect the optical device and the optical fiber that is the object of the optical connection directly.

Furthermore, as to the optical communication module, the optical connection sleeve having the foregoing constitution can be applied to various optical communication modules in addition to the optical transceiver shown in FIG. 4, which comprises the photodetector module and the light emitting module. As such an optical communication module, for example, there has been a light receiving module in which a photodetector module and an electronic circuit for reception are held integrally by a housing, a light transmitting module in which a light emitting module and an electronic circuit for transmission are held integrally by a housing, and the like.

Furthermore, as to a concrete constitution of the optical connection sleeve 1, the ferrule fixing surface 21 provided on the inner peripheral surface of the ferrule insertion portion 2 is formed to be approximately cylindrical in the optical connection sleeve 1 shown in FIG. 1. On the contrary, it is possible to enhance detachability of the ferrule against the optical connection sleeve by forming the ferrule fixing surface 21 with a multifaceted shape.

Figure 8:
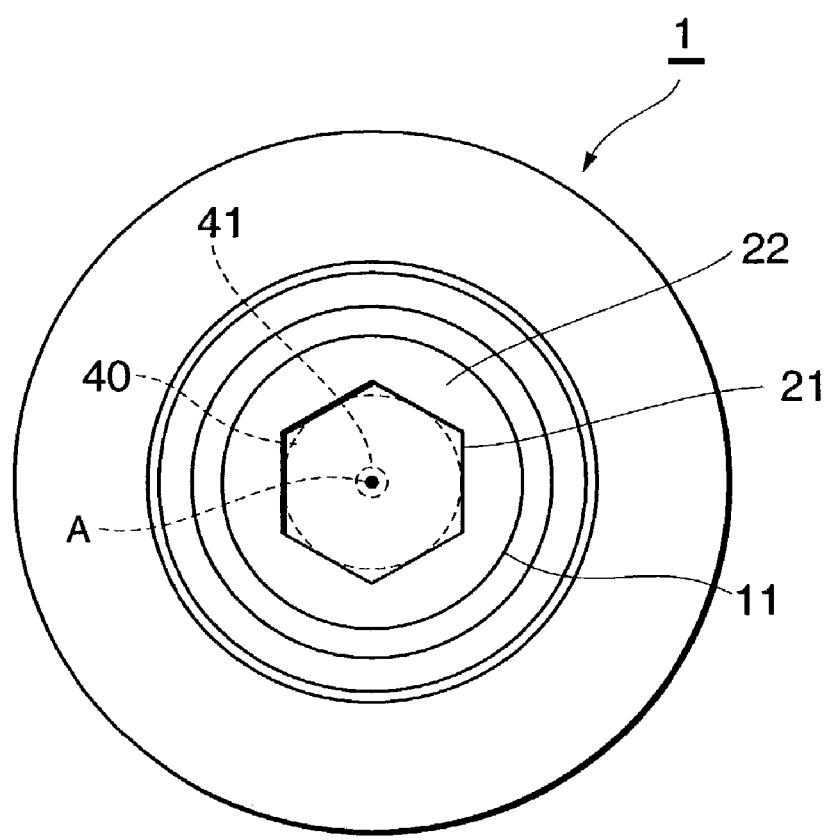
FIG. 8 is a plan view showing a constitution of another embodiment of the optical connection sleeve, which is viewed from a direction from which an optical fiber ferrule is inserted therein.
Figure 9:
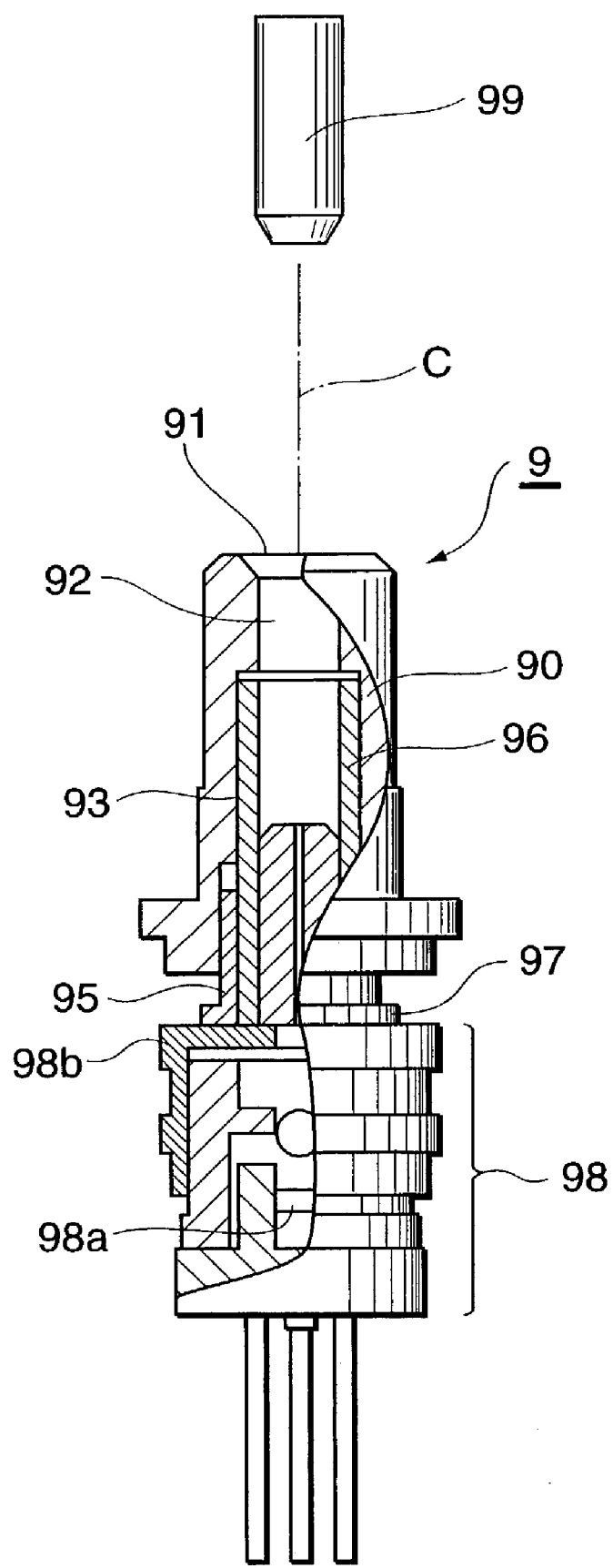
FIG. 9 is a side view partially opened showing a constitution of a conventional optical connection sleeve.

An example of an optical connection sleeve having such a multifaceted ferrule fixing surface is shown in FIG. 8. FIG. 8 shows a plan view of the optical connection sleeve 1 viewed from a direction where the optical fiber ferrule 40 is inserted thereto.

In terms of this optical connection sleeve 1, as to ferrule fixing surface 21 provided on the inner peripheral surface of the ferrule insertion portion 2, as shown in FIG. 8, a cross sectional shape of the ferrule fixing surface 21 on the plane vertical to the optical axis A is a regular hexagonal shape surrounding the ferrule 40 of an approximately cylindrical shape, which is inserted in the ferrule insertion hole 20. The ferrule fixing surface 21 has a six surface shape as a whole composed of six surfaces, in which six sides of the regular hexagon in the above cross section extend along the optical axis A, respectively.

As described above, the ferrule fixing surface 21 is made to be multifaceted (the number N of the surfaces is an integer no fewer than 3), whereby the outer peripheral surface of the ferrule 40 inserted in the ferrule insertion portion 2 of the resin sleeve 15 and the ferrule fixing surface 21 that is the inner peripheral surface of the ferrule insertion hole 20 make a line contact in each face of the multifaceted shape. At this time, compared to the case where the outer peripheral surface of the ferrule and the ferrule fixing surface make a surface contact, a contact area becomes smaller. Accordingly, the detachability of the ferrule 40 to the optical connection sleeve 1 is enhanced.

In such a constitution, it is preferable that the number N of the surfaces of the multifaceted shape is an integer no fewer than 3, nor more than 8 ($3 \leq N \leq 8$). The optical connection sleeve 1 having the multifaceted ferrule fixing surface 21, in which its cross sectional shape is triangular to octagonal, can make holding of the optical fiber ferrule 40 with high accuracy and the good detachability of the ferrule 40 compatible with each other sufficiently. In this case, particularly, as shown in the foregoing constitution example, it is preferable that the number N of the surfaces in the multifaceted ferrule fixing surface 21 is set to N=6 and that the cross section thereof has the hexagonal shape such as a regular hexagon.

Moreover, the ferrule fixing surface 21 is preferably formed in a taper shape in which the area in the ferrule insertion hole 20, which is surrounded by the polygonal cross section in the plane vertical to the optical axis A, becomes smaller toward the other end portion 12 from the one end portion 10. Accordingly, the optical fiber ferrule 40 can be thoroughly held by the tight fit with higher accuracy.

Here, the ferrule fixing surface 21 may be formed so that the area in the ferrule insertion hole 20 becomes constant.

The optical connection sleeve, the optical module and the optical communication module according to the present invention can be available as an optical connection sleeve in which an optical fiber and an optical component such as an optical device are optically connected to each other with high accuracy, and influences of electromagnetic noises are fully reduced, and an optical module and an optical communication module using the optical connection sleeve.

Specifically, according to an optical connection sleeve constituted by a resin sleeve that is a portion including an end portion in which an optical fiber is inserted and by a metal sleeve fixed to the resin sleeve by the insert-mold and the like, the metal sleeve being a portion including an end portion closer to a position where the optical component is located, occurrence of a positional deviation between the sleeve and the optical device unit or the like after an optical axis alignment is suppressed.

At the same time, it is possible to prevent the sleeve portion extending cylindrically from functioning as an antenna which receives electromagnetic noises from the outside and radiates electromagnetic noises from the inside. Thus, the optical connection sleeve, in which the optical fiber and the optical component such as the optical device are optically connected with high accuracy and the influences of the electromagnetic noises are fully reduced, is realized.

What is claimed is:

1. An optical connection sleeve having a ferrule insertion portion including one end portion and an optical connection portion including other end portion, said optical connection sleeve being formed around an optical axis of optical connection as a central axis and optically connecting an optical fiber, which is inserted along said central axis from said end portion, to an optical component disposed on said other end portion, the optical connection sleeve comprising:
   a resin-made first sleeve including the whole of said ferrule insertion portion in which a ferrule provided in a tip of said optical fiber is inserted; and
   a metal-made second sleeve including a portion of said optical connection portion and having a flange portion which positions and fixes said optical component thereto, said second sleeve being fixed to said first sleeve,
   wherein said first sleeve secures and covers a portion of said second sleeve, and
   wherein said second sleeve includes a protrusion portion provided annularly on an outer peripheral surface thereof, said first sleeve securing said protrusion to reinforce fixing strength.

2. The optical connection sleeve according to claim 1, wherein said first sleeve has a first bore having a first diameter and said second sleeve has a second bore having a second diameter substantially equal to said first diameter.

3. An optical module, comprising:
   an optical connection sleeve having a ferrule insertion portion including one end portion and an optical connection portion including other end portion, said optical connection sleeve being formed around an optical axis of optical connection as a central axis, said optical connection sleeve including,
   a resin-made first sleeve including the whole of said ferrule insertion portion in which an external ferrule provided in a tip of an optical fiber is inserted along said central axis from said end portion, and
   a metal-made second sleeve including a portion of said optical connection portion and having a flange portion, said second sleeve being fixed, secured to and covered with said first sleeve; and
   an optical device unit disposed on said other end portion of said optical connection sleeve, said optical device unit including,
   a stem portion for mounting an optical device thereon,
   a cap portion having a lens, said cap portion enclosing said optical device therein by communicating with said stem portion, and
   a fixing part having a sleeve fixing face for positioning and fixing said second sleeve thereon, said fixing part covering side and top surfaces of said cap portion, wherein
   said second sleeve includes a protrusion portion provided annularly on an outer peripheral surface thereof, said first sleeve securing said protrusion to reinforce fixing strength.

4. The optical module according to claim 3, wherein said first sleeve has a first bore having a first diameter and said second sleeve has a second bore having a second diameter substantially equal to said first diameter, and
   said module further comprises an internal ferrule provided in said optical connection portion, said internal ferrule having an internal fiber in a center thereof and an end face in a side of said one end portion of said optical connection sleeve, a tip of said internal fiber being exposed on said end face of said internal ferrule such that an optical coupling between said internal fiber and said optical fiber is performed when said external ferrule is inserted in said ferrule insertion portion and in contact with said internal ferrule.

5. The optical module according to claim 3, further comprising a glass member having an end face in said side of said end portion of said sleeve and the other end face opposite to said end face, said optical fiber being in contact with said end face of said glass member when said external ferrule is inserted in said ferrule insertion portion.

6. The optical module according to claim 5, wherein said other end face of said glass member is inclined with said central axis of said optical connection sleeve.

* * * * *